United States Patent
Wang et al.

(10) Patent No.: US 10,390,312 B2
(45) Date of Patent: Aug. 20, 2019

(54) DATA DRIVEN MANAGEMENT METHOD AND DEVICE OF SMALL CELL NETWORK

(71) Applicant: NATIONAL CHIAO TUNG UNIVERSITY, Hsinchu (TW)

(72) Inventors: Li-Chun Wang, Hsinchu (TW); Shao-Hung Cheng, Taoyuan (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/969,357

(22) Filed: May 2, 2018

(65) Prior Publication Data
US 2018/0324712 A1    Nov. 8, 2018

(30) Foreign Application Priority Data
May 8, 2017    (TW) .............................. 106115202 A

(51) Int. Cl.
| | |
|---|---|
| *H04W 52/24* | (2009.01) |
| *H04W 24/02* | (2009.01) |
| *H04W 16/22* | (2009.01) |
| *H04W 84/04* | (2009.01) |
| *H04W 84/10* | (2009.01) |

(52) U.S. Cl.
CPC ......... *H04W 52/244* (2013.01); *H04W 16/22* (2013.01); *H04W 24/02* (2013.01); *H04W 52/245* (2013.01); *H04W 84/045* (2013.01); *H04W 84/10* (2013.01)

(58) Field of Classification Search
CPC .... H04W 16/22; H04W 24/02; H04W 52/245
See application file for complete search history.

(56) References Cited

U.S. PATENT DOCUMENTS

| | | | | |
|---|---|---|---|---|
| 2014/0051419 | A1* | 2/2014 | Brend | H04W 52/0206 455/418 |
| 2015/0341211 | A1* | 11/2015 | Saha | H04L 41/0823 709/221 |
| 2018/0295528 | A1* | 10/2018 | Anantha | H04W 24/02 |

FOREIGN PATENT DOCUMENTS

TW    I505740 B    10/2015

OTHER PUBLICATIONS

Peng et al., "Optimal Base Station Density of Power Efficient Small Cell Networks," Master Thesis of National Chiao Tung University Institute of Communications Engineering, May 2014, 65 pages.
(Continued)

*Primary Examiner* — Dong-Chang Shiue
(74) *Attorney, Agent, or Firm* — Muncy, Geissler, Olds & Lowe, P.C.

(57) ABSTRACT

A data driven management device of a small cell network is provided, wherein the device includes a data receiver, a data processor and a data configurator. The data receiver receives parameters configured and managed from each of small cells. The data processor is configured to pre-process the received parameters to remove the unnecessary parameters and to calculate at least one performance result based on the pre-processed parameters. The data processor is further configured to establish a model based on at least one of the pre-processed parameters. The data processor determines the optimized parameter based on the best performance result of the model to determine a decision result. The data configurator is connected to the data processor and configures and manages the small cells based on the decision result.

9 Claims, 4 Drawing Sheets

(56) References Cited

OTHER PUBLICATIONS

3GPP Organizational Partners, "$3^{rd}$ Generation Partnership Project; Technical Specification Group Radio Access Network; Small cell enhancements for E-Utra and E-Utran—Physical layer aspects," (Release 12) 3GPP, Technical Report. TR 36.872, V12.1.0, Dec. 2013, 100 pages.

Ting et al., "Downlink Co-Tier Interference Mitigation for Femtocell Networks," 2014 Tenth International Conference on Intelligent Information Hiding and Multimedia Signal Processing, IEEE Computer Society, 2014, pp. 898-901.

Wang et al., "QoS-aware Interference Control in OFDMA Femtocell Networks," Energy 2015: The Fifth International Conference on Smart Grids, Green Communications and IT Energy-aware Technologies, pp. 42-46.

Zhao et al., "Improving UE SINR and Networks Energy Efficiency based on Femtocell Self-Optimization Capability," IEEE WCNC 2014, Workshop on Self-Organizing Networks, pp. 155-160.

\* cited by examiner

DATA DRIVEN MANAGEMENT METHOD AND DEVICE OF SMALL CELL NETWORK

CROSS-REFERENCE TO RELATED APPLICATION

This application claims priority from Taiwan Patent Application No. 106115202, filed on May 8, 2017 at Taiwan Intellectual Property Office, the contents of which are hereby incorporated by reference in their entirety for all purposes.

BACKGROUND OF THE INVENTION

1. Field of the Invention

The present invention is related to a method and a device of small cell network management, in particular, a data driven management method for determining the configuration parameter of each small cell within a network system and a data driven management device configuring the new parameters in the ultra-dense small cells.

2. Description of the Related Art

New developments in communication technologies have higher system performance requirements. In this case, the requirement is a seamless connection between small cells and user devices, and the network architecture is such that it contains a plurality of small cells deployed in smaller areas. A problem with this ultra-dense small cell network architecture type is that the cells may seriously interfere the non-served user devices from the other neighboring cells. Thus, the transmission power of the devices in the small cell network may require a further control in order to reduce this problem.

Taiwan Patent No 1505740 provides a control device and control method to adjust dynamically transmission power of small cells, but the U.S. Pat. No. 1,505,740 did not consider the architecture of ultra-dense small cells. In other words, the power control mechanism provided in Taiwan Patent No 1505740 is mainly to observe the information of the number of the interfered terminal devices within the service range of each small cell. The U.S. Pat. No. 1,505,740 determines the power configuration parameter of each cell based on these in above information, so that the interference may be suppressed.

CT. Peng (Optimal Cell Density of Power Efficient Small Cell Networks, Master Thesis of National Chiao Tung University Institute of Telecommunications Engineering, 2013) and the technical report of 3GPP TR 36.872 (Small cell enhancements for E-UTRA and E-UTRAN—Physical layer aspects (Release 12), 3GPP, Tech. Rep. TR 36.872 V12.1.0, December 2013.) discuss "co-tier interference" and energy saving issues. Both of them discussed energy saving by utilizing a switch mechanism for the small cells, but neither of them has further discussed the transmission power adjustment of each cell in the ultra-dense small cells which are still open. Hence, the energy efficiency for the system is not optimized.

In addition, K. Ting (Downlink Co-Tier Interference Mitigation for Femtocell Networks, International Conference on Computer Engineering and Systems (ICCES), pp. 898-901, 2014.) and C. Wang (QoS-aware Interference Control in OFDMA Femtocell Networks, The Fifth International Conference on Smart Grids, Green Communications and IT Energy-aware Technologies, 2015) discussed the issues of co-tier interference between the downlink (DL) of femtocells and try to discover a method to suppress the interference by the means of power control.

Furthermore, K. Ting considered the number of edge-user devices (i.e. in overlapping areas of the cells) of each small cell located in overlapping areas of the cells. The small cells will be considered as trouble nodes if the number of edge-user devices serviced by the small cells is large. Then, the power of the trouble nodes will be adjusted to lower the interference. However, K. Ting did not discuss the influences to energy efficiency affected by the adjustment of power.

C. Wang defined the trouble nodes either, but still has some difference in the defining method in comparison with K. Ting. C. Wang mainly calculated the number of the nearby small cells that have the overlapping area between cells, and considered the small cells which have excess overlapping of the nearby small cells as trouble nodes. C. Wang improves spectral efficiency by reducing the transmission power of the trouble nodes so that the overlapping level of the coverage area of the trouble nodes and the nearby small cells are lowered. However, C. Wang merely discussed the conditions groups of 3 cells and 6 cells, found out and adjusted one trouble node, but did not estimate the architecture of ultra-dense small cells, and did not have any discussion about the energy saving level. Furthermore, both C. Wang and K. Ting did not have any discussion regarding the issue with self-organizing network (SON).

X. Zhao (Improving UE SINR and Networks Energy Efficiency based on Femtocell Self-Optimization Capability, Wireless Communications and Networking Conference Workshops (WCNCW), 2014 IEEE, pp. 155-160, April 2014) discussed and designed the issue incorporated with the concept of SON. Wherein, the mechanism calculated the coverage radius (which is called virtual cell size in the paper) of each cell and utilized position information beforehand. If the user device is within the coverage radius of the small cell, the small cell is configured to an ON status; if the user device is out of the coverage radius of the small cell, then the small cell is configured to an OFF status. The user device of the original service is serviced by a macro cell. The network performance is successfully improved according to the above mechanism. However, the simulative condition model of X. Zhao's had a configuration of only 10 small cells in each sector of the macro cell, which is not an ultra-dense network. Further, it did not design a mechanism for dynamic adjustment of transmission power and thereby lowering the interference level between each cell with an ON status.

SUMMARY OF THE INVENTION

The embodiments of the present invention provide a data driven management device of a small cell network, wherein the data driven management device manages ultra-dense small cells within a network system and comprises a data receiver, a data processor and a data configurator. The data receiver is configured to receive a plurality of parameters configured and managed by each small cell. The data processor is connected to the data receiver, and comprises a data pre-processing module, a performance prediction establishing model and a self-optimizing parameter control module. The data pre-processing module is configured to pre-process the received parameters to remove the unnecessary parameters and to calculate at least one performance result based on the pre-processed parameters. The performance predicting model establishing module is configured to establish a model based on at least one of the pre-processed parameters. The self-optimizing parameter control module is configured to determine an optimized parameter based on a best performance result of the model to output a decision result based on the optimized parameters. The data configurator is connected to the data processor, and configures and manages each cell based on the decision result.

The embodiments of the present invention further provide a cell management method executed in the management device mentioned above.

Accordingly, the management device and method have the following advantages in comparison with prior art:

(1) Under the considerations of cost-effectiveness, the present invention combines statistical analysis methods, and the operating network may be managed automatically and intelligently by combining the methods of statistical analysis, data-driven, and the concept of SON;

(2) The present invention may reduce the high cost of manual intervention with the network components;

(3) The present invention may maintain the overall network system at an elevated performance for a long term;

(4) The present invention may be utilized in an ultra-dense network, and may, in order to improve the performance of the network, re-configure and manage each cell in response to the condition that the density of the user devices may dynamic change at any time.

DESCRIPTION OF THE PREFERRED EMBODIMENTS

Figure 1:
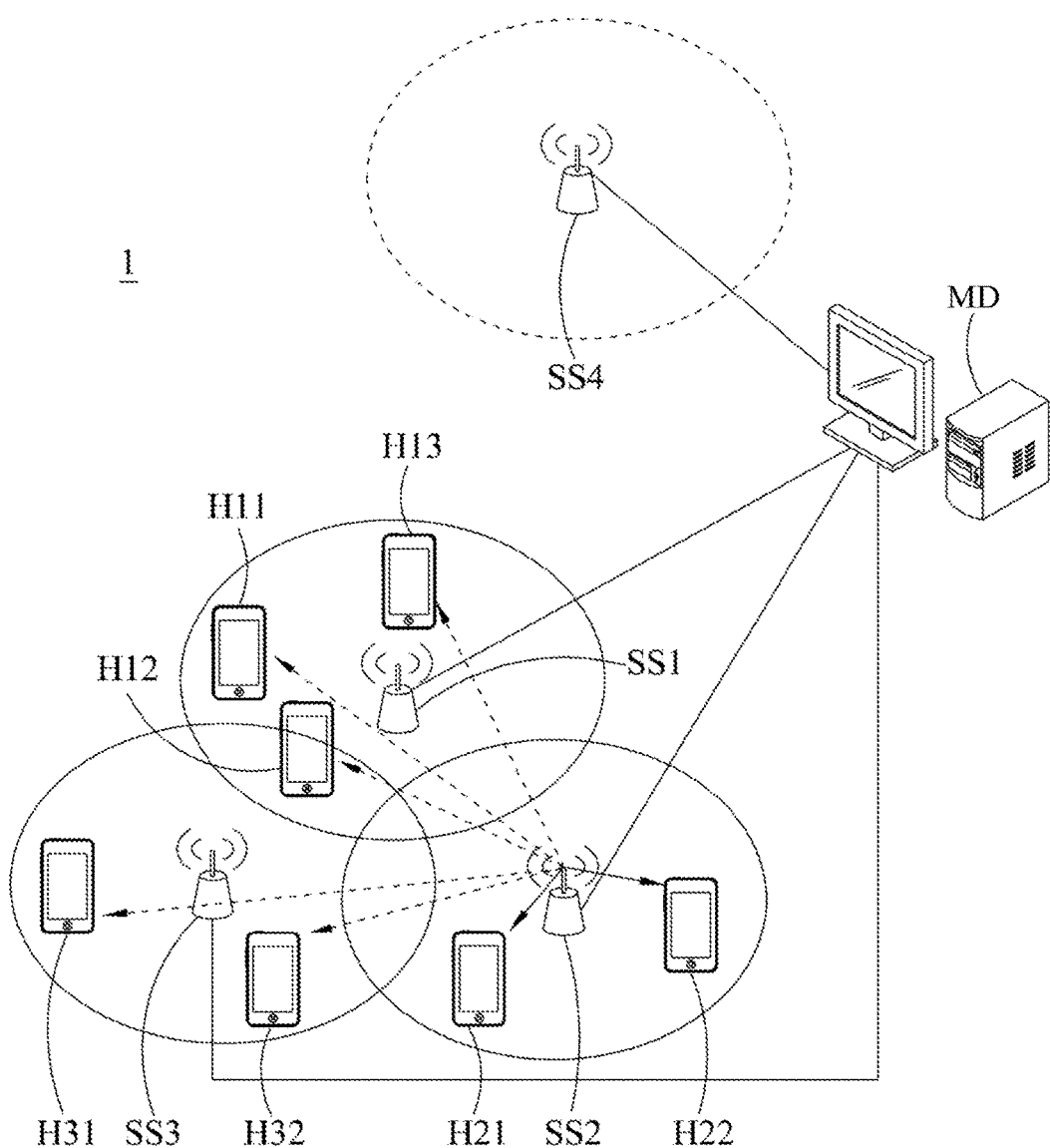
FIG. 1 is a schematic view of architecture of a network system of an embodiment of the present invention.

Since mobile network service will dramatically increase in the future, the evolution of network architecture from traditional homogenous network to heterogeneous network (Hetnet) is already a trend in response to the huge network traffic requirements. Entire capacities of entire communication systems and dead zone with poor network connectivity although within network range (due to wireless interference, locational relationships, and material interference) of the coverage range of a macro cell may be improved by configuring small cells within a service coverage range of a macro cell. The main advantage of this configuration of the small cells within the service coverage range of the macro cell is that the cost of the configuration of the small cells is relative lower. In this way, the system performance improvement may be achieved even though the total network cost is lower.

From the perspective of telecom operators, the reduction of capital expenditure and operating costs are necessary conditions to maintain revenue. Whereas, a customer's concern is typically good communication service quality. By providing good service to the telecom customer, which in turn will gain reasonable and expected profit, a balance must be struck between profit and service, where a mutually beneficial relationship is formed. To satisfy these quality demands, the present invention combines the methods of statistical analysis, data-driven networks, and the concept of the SON under the considerations of cost-effectiveness, so that the operating network may be managed automatically and intelligently. The present invention may reduce the high cost of manual intervention through automatic management, and may maintain the overall network system at an elevated performance for a long term through intelligent management.

The SON has been developed in recent years enables a network system to have auto-adjustment ability. The present performing mechanism of the SON is mainly to automatically and periodically collect the information obtained by nearby small cells to drive a test and to monitor the status of network performance. If the performance does not reach an expected performance standard, an SON engine will be started up for analysis and calculation. A new network configuration set of parameters will be generated, and the network will be re-configured, so that the network performance may reach the expected standard by the automatic adjustment.

The existing core engine for 3G and 4G SON consists of a static analysis model and an optimization algorithm. Wherein, the static model is unchanged, and does not automatically update corresponding to the density variety of user devices, so that information for the optimized set of parameters could not be projected at any singular time point. This is the problem of the existing SON mechanism. However, the present invention provides a data driven performance predicting model establishing mechanism, which continuously collects all of the configured and managed parameters from all of the small cells, periodically processes and analyzes the parameters by statistical analysis of mathematical methods, and dynamically updates the performance predicting model, so that the performance predicting model may provide the optimized parameter at the time and support the algorithm to generate the newest configuration parameters.

Additionally, the present invention provides a self-optimized power controlling mechanism contrary to an outdoor network configuration with an extremely high density of small cells, and provides information for parameters through the data driven performance prediction model. The present invention may adjust transmission power preferentially against the small cells having high interference level at a high density configuration in order to improve the energy efficiency. A SON core mechanism consisting of the establishment of a data driven performance predicting model having auto-updating and auto-fixed functions and self-optimized power controlling mechanism is defined as Data-driven Self Organizing Network (D-SON) architecture. The concept of the present invention is described as above, and the embodiments of the present invention that are then explained are taken in conjunction with the drawings.

First, please refer to FIG. 1. FIG. 1 is a schematic view of architecture of a network system of an embodiment of the present invention. Network system 1 is a heterogeneous network system comprising a management device MD, a plurality of small cells SS1-SS4, and a plurality of user devices H11-H13, H21, H22, H31 and H32. Wherein, the management device MD is connected with the small cells SS1-SS4. Each of the small cells SS1-SS4 has its own coverage range. Small cells SS1-SS3 are independently in service to the user devices H11-H13, H21, H22, H31 and H32 within the small cell's own coverage range. Aforementioned management device MD may be a macro cell, and the small cells SS1-SS4 may be a femtocell or a pico cell, but the present invention is not limited to the types of the cells used by the management device MD and the small cells SS1-SS4. In the network system 1, the configuration density is set to thousands of small cells per km$^2$, that is, an ultra-dense network.

To respond to condition of spontaneous configuration density changes, a management device of the embodiment of the present invention may be disposed at the management device MD. The management device may continuously collect the parameters configured and managed by all of the small cells, and periodically processes and analyzes the parameters by statistical analysis of mathematical methods, and dynamically updates the performance predicting model, so that the performance predicting model may provide the optimized parameters at the time and support the algorithm to generate the newest configuration parameters.

Figure 2:
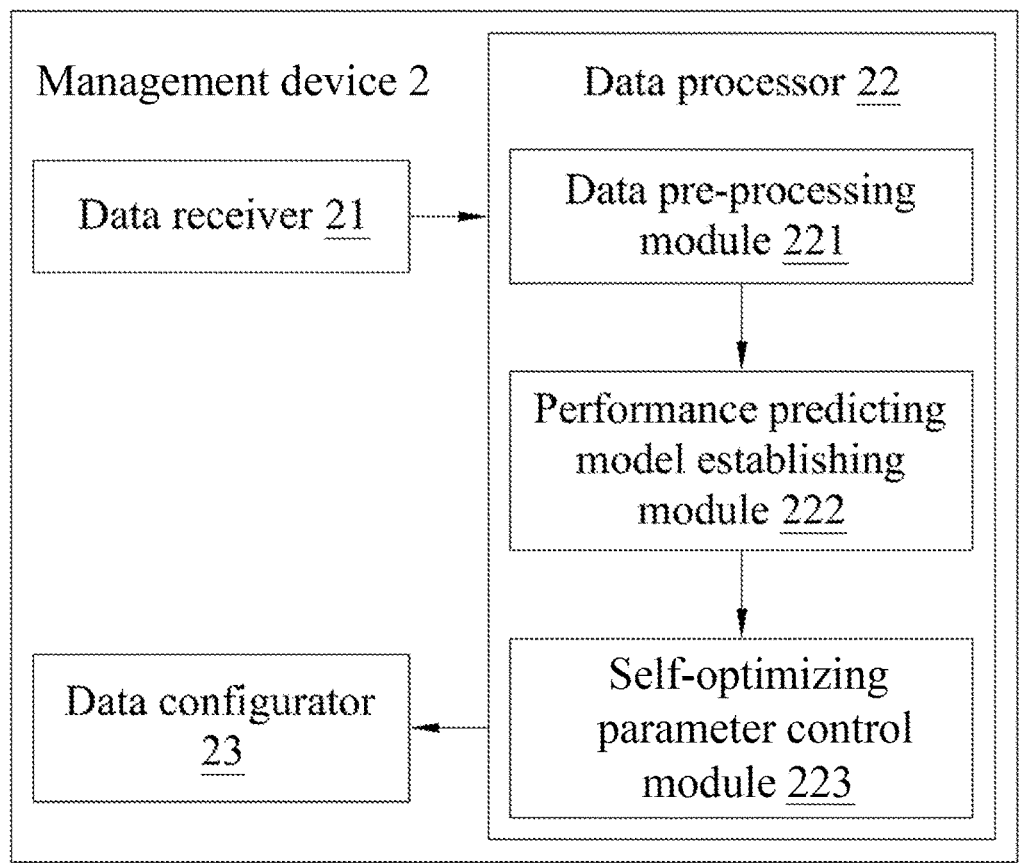
FIG. 2 is a block diagram of a management device of an embodiment of the present invention.

Please refer to FIG. 2. FIG. 2 is a block diagram of a management device of an embodiment of the present invention. The management device 2 may be achieved by a computer device in cooperation with software or only by a simple hardware circuit, but the means are not limited thereto. The management device 2 comprises a data receiver 21, a data processor 22 and a data configurator 23. The data receiver 21 is configured to receive parameters from each of the small cells, and to send the received parameters to the data processor 22 connected therewith. The data processor 22 may process and analysis the parameters in order to update a performance predicting model automatically and dynamically and send the optimized parameter to the data configurator 23 connected therewith. The data configurator 23 configures at least one small cell based on the received optimized parameters.

The configured and managed parameters from each of the small cells mentioned above comprises transmission power, number of serviced user devices, small cell identification, serviced user device identification, transmission power of small cell, reference signal received power (RSRP) of serviced user device, and status of physical resource block. However, the present invention is not limited to the aforementioned types or numbers of the parameters.

The data processor 22 may comprises a data pre-processing module 221, a performance predicting model establishing module 222 and a self-optimizing parameter control module 223. Wherein, the data pre-processing module 221 connects to the performance predicting model establishing module 222, and the performance predicting model establishing module 222 connects to the self-optimizing parameter control module 223. The data pre-processing module 221 is configured to pre-process information in order to execute a large number of data clearing and inspecting program, which selects, arranges, splits, and/or combines the parameters received from the data receiver 21 then outputs pre-processed parameters. Wherein, the parameters (in the following example, since the status of physical resource block is not need to be used, it will be removed), which are not needed to be used afterward may be removed within the program. The data pre-processing module 221 further calculates the performance results based on the pre-processed parameters. For example, the energy efficiency and system throughput are obtained based on the number of serviced user devices, the RSRP from the user device, and the transmission power of small cell. It has to be noticed that the type of the removed parameters may be different in a different condition, and the type of the obtained performance results may also be different.

Subsequently, the data pre-processing module 221 will determine whether performance result is lower than a predetermined threshold to decide whether updating the performance predicting model and re-configuring the parameters of each small cell are necessary or not. For instance, the energy efficiency is not lower than or equal to the predetermined threshold (e.g. 80%, but is not limited thereto), it is unnecessary to update the performance predicting model and re-configure the parameters of each small cell. However, if the energy efficiency is lower that the predetermined threshold, the data pre-processing module 221 will instruct the performance predicting model establishing module 222 to establish a performance predicting model, That is, the performance predicting model establishing module 222 is a data-driven module. The performance predicting model establishing module 222 may establish a performance predicting model based on at least one of the pre-processed parameters by means of such as polynomial regression analysis method. The present invention is not limited to the polynomial regression analysis method, other means for establishing a model may also be applied in the present invention. Furthermore, the performance predicting module establishing module 22 may establish a performance predicting model according to the obtained performance result based on at least one of the pre-processed parameters.

After the performance predicting model is established, the self-optimizing parameter control module 223 may obtain the parameters which are corresponded to the optimized performance result within the performance predicting model. Then, the self-optimizing parameter control module 223 generates a decision result which be sent to the data configurator 23. Subsequently, the data configurator 23 decides a result such as shutting down some of the small cells (i.e. switching some of the small cells into a dormant status) and adjust the power of some of the small cells to a lower specific power value (e.g. 1 mW).

For example, consider the system throughput as the performance result the performance predicting model establishing module 22 which may detect a number S of the small cells which are not in service to any user devices. Then, the performance predicting model establishing module 222 calculates a reference index value of the active small cells (e.g. a reciprocal of a total signal strength value of the small cells, a total interference value or a ratio of interference value and load sensing value obtained according to a ratio of the total reference value and the total signal strength value), and sorts the active small cells based on their reference index value. Subsequently, the performance predicting model establishing module 222 selects and lowers the power of the small cells which are corresponded to reference index value or values ranked in top k in which k is a value from 1 to Q-S, to calculate the system throughput corresponded to each of the k values and obtain the performance predicting model of each of the k values and the system throughput corresponded thereto by a regression analysis method, wherein Q is a total number of the small cells. In other words, the system throughput corresponding to each of the k values may be calculated. Then, the performance predicting module establishing 222 obtains a performance predicting model of k values and system parameter throughput by means of the polynomial regression analysis method.

Subsequently, the self-optimizing parameter control module 223 selects the k* value corresponded to that which has the highest system throughput based on the performance predicting model, and generates decision results of lowering the power of the small cells which ranked in top k* of the reference index value, shutting down S number of the small cells which are not in service to any user devices, and not adjusting the power of the other Q-S-K* number of the small cells. Then, the data configurator 23 configures and manages the small cells based on the decision results. Wherein, the S number of the small cells which are not in service to any user device will be shut down, and the transmission power of the small cells ranked in top k* of the reference will be lowered. Afterward, the data pre-processing module 221 further monitors whether the calculated system throughput approaches the best system throughput within the performance predicting model or not. If approaches these values, then the performance predicting model does not need to be updated, if not, then the performance predicting model should be updated.

Figure 3:
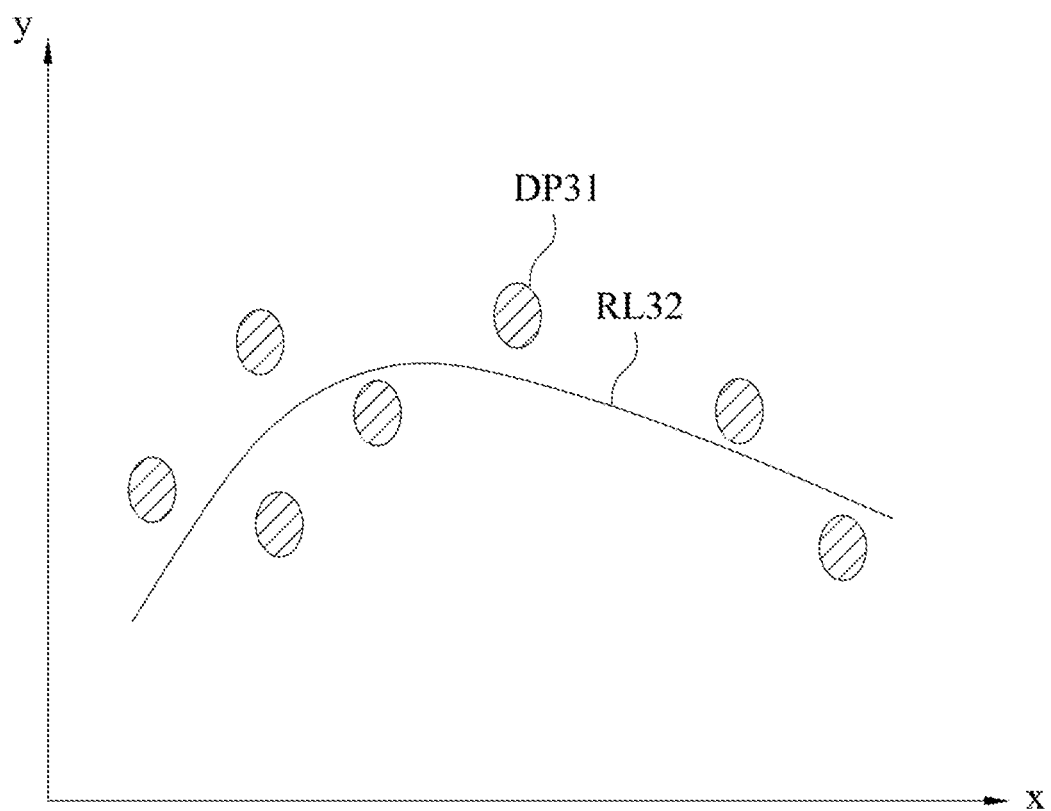
FIG. 3 is a schematic view of a model of an embodiment of the present invention which is established by polynomial regression analysis method.

The regression curve function of the aforementioned polynomial regression analysis method may be represented as $y(x,w)=w_0+w_1x^1+ \ldots +w_Mx^M$, wherein M denotes the order of the polynomial, x denotes the independent variable, y denotes the relative variable, and $w_0 \ldots w_M$ denotes the weighting factor. Using the system throughput as an example, y denotes the system throughput, and x is k. Please refer to FIG. 3, FIG. 3 is a schematic view of the model established by means of the polynomial regression analysis method. As shown in FIG. 3, the curve RL32 of the performance predicting model established by the polynomial regression analysis method approaches the coordinate points DP31 of the performances and parameters.

Subsequently, the aforementioned reference index value will be further explained. Please refer to FIG. 1 of the present invention correspondingly. The total signal strength value of each small cell is the sum of the received signal strength from each user device within the coverage range of the small cells from which the service is provided. For instance, the total signal strength of the small cell SS3 is the sum of the received signal strength of the served user devices H31 and H32 in the small cell SS3. The more user devices in a small cell may be had the higher the total signal strength value. Hence, if the small cell has a relatively higher total signal strength to set lower transmission power, the service quality of more user devices may become worse. Thus, the reference index value may be a reciprocal of the total strength value of the small cells.

The total interference value of each small cell is the sum of received interference signal of each served user device by the cell. For instance, the total interference value of the small cell SS2 is the sum of received interference signal by the user devices H11-H13, H31 and H32 from the small cell SS2. The higher the interference value is, the more user devices are interfered thereby. Hence, the interference of relatively more user devices may be reduced by lowering the power of the small cell having relatively higher total interference value. Hence, the reference index value may be a total interference value of a small cell. Furthermore, taking the two factors of interference and service quality into account, the reference index value may also be a value of the total interference value of the small cell divided by the total signal strength value of the small cell.

Figure 4:
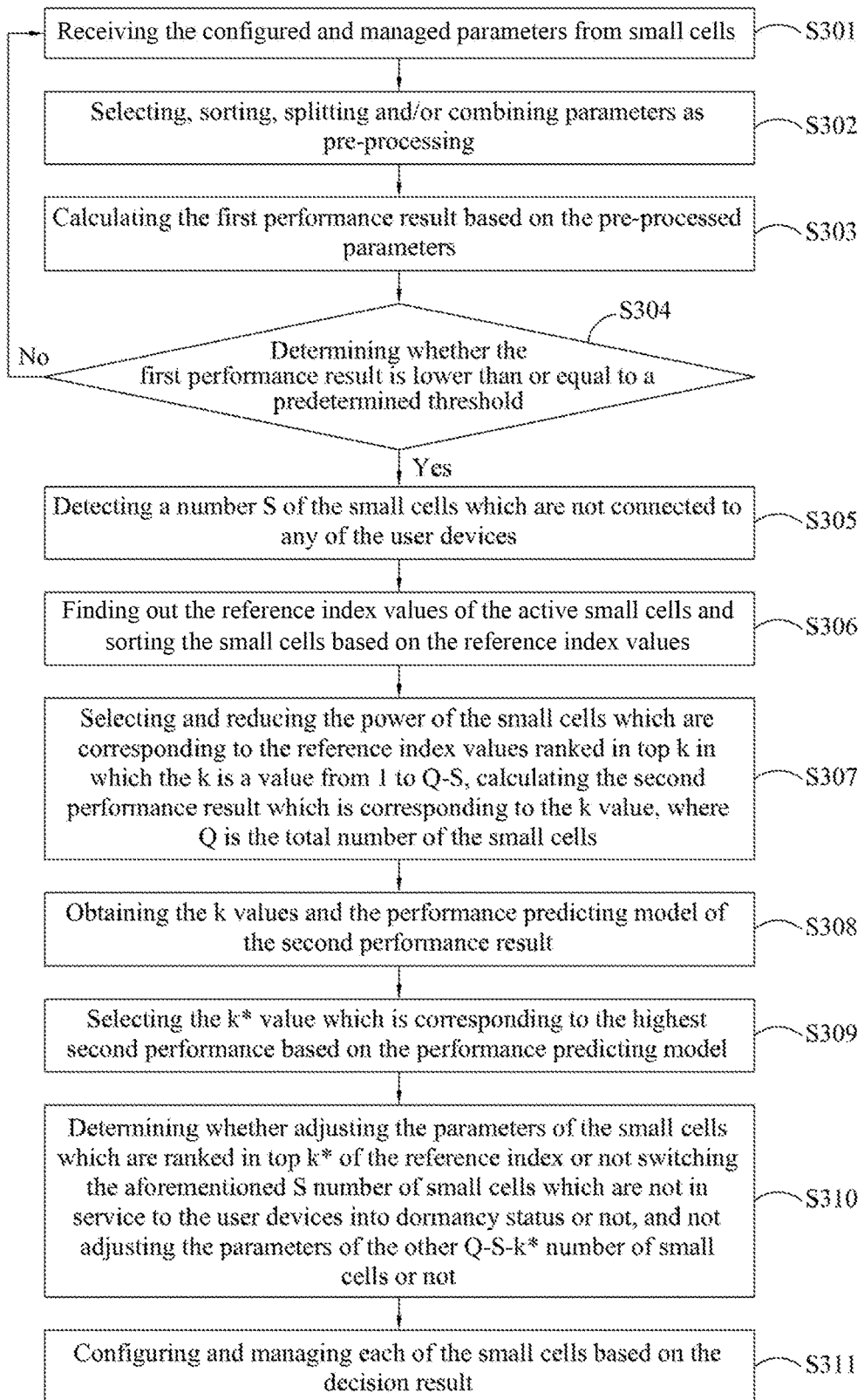
FIG. 4 is a flowing chart of a cell management method of an embodiment of the present invention.

Then, please refer to FIG. 4. FIG. 4 is a flowing chart of a cell management method of an embodiment of the present invention. First, in step S301, the configured and managed parameters from the small cells are received. Then, in step S302, pre-processing is achieved by selecting, sorting, splitting and/or combining parameters for the parameter clearing and inspecting program, and unnecessary parameters are removed. In step S303, a first performance result may be calculated based on the pre-processed parameters. For example, the first performance result may be energy efficiency. In step S304, determining whether the first performance result is lower than or equal to a predetermined threshold. If the first performance result is higher than the predetermined threshold, it denotes that it is unnecessary to configure and manage each of the small cells, and the process returns to step S301; in contrast, if the first performance result is lower than or equal to the predetermined threshold, it denotes that it is necessary to configure and manage each of the small cells, and the process continues to step S305.

In step S305, detecting a number S of the small cells which are not connected to any of the user devices. In step S306, finding out the reference index values of the active small cells and sorting the small cells based on the reference index values. In step S307, selecting and reducing the power of the small cells which are corresponding to the reference index values ranked in top k in which the k is a value from 1 to Q-S, calculating the second performance which is corresponded to the k value. Wherein, Q is a total number of the small cells, and the second result may be system throughput. In other words, in step S307, the second performance results corresponded to each of the k values are calculated. Then, in step S308, the k values and the performance predicting model of the second performance result are obtained by a regression analysis (e.g. polynomial regression analysis method. In step S309, the k* value corresponded to the highest second performance result is selected based on the performance predicting model.

Then, in step S310, determining whether adjusting the parameters of the small cells which ranked in top k* of the reference index value or not (e.g. reducing the transmission power), switching the aforementioned S number of small cells which are not in service to the user devices into dormancy status or not, and not adjusting the parameters of the other Q-S-k* number of small cells or not (e.g. not adjusting the power), to generate a decision result accordingly. Then, in step S311, each of the small cells is configured and managed based on the decision result.

It has to be noticed that even though the present embodiment describes the type of the first performance result being different from the type of the second performance result as an example, a person skilled in the ordinary art will be able to understand that the type of the first performance result may be the same as the type of the second performance result, i.e. both of the first performance and the second performance may be system throughput. In addition, said steps S305-S310 describe that establishing the performance predicting model of the k value and the system throughput then selecting the optimized k* value as an example, but the present invention is not limited thereto. For instance, it may also be modified as a performance predicting model of the k value and the energy efficiency or a performance predicting model of the other parameters or other performances results.

In other words, the present invention may configure and manage each small cell to select the optimized parameter of the best performance results based on the established performance predicting model.

As mentioned above, the management device provided in the embodiments of the present invention continuously collects the parameters configured and managed by all of the small cells, periodically processes and analyzes the parameters by statistical analysis of mathematical methods, and dynamically updates the performance predicting model, so that the performance predicting model may provide the optimized set of parameter at the time and support the algorithm to generate the newest configuration parameters.

The content of the embodiment described above is merely at least one of various implementations. A person skilled in the art is able to understand the core concept of the present invention after reading the content of above, and to modify the embodiments depending on requirements. In other words, the embodiments described above are not intended to limit the present invention. The scope protected by the present invention is defined by the appended claims.

What is claimed is:

1. A data driven management device of a small cell network, wherein the data driven management device manages ultra-dense small cells within an network system and comprises:
   a data receiver receiving configured and managed parameters from each of the small cells;
   a data processor connected to the data receiver, comprising:
      a data pre-processing module configured to pre-process the received parameters to remove unnecessary parameters and calculate at least one performance result based on the pre-processed parameters;
      a performance predicting model establishing module configured to establish a performance predicting model based on at least one of the pre-processed parameters; and
      a self-optimizing parameter control module configured to determine an optimized parameter based on a best performance result of the performance predicting model to output a decision result; and
   a data configurator connected to the data processor, and configuring and managing each of the small cells based on the decision result;
   wherein
   the performance predicting model establishing module calculates a reference index value of active small cells and sorts the active small cells based on the reference index value; and
   the performance predicting model establishing module selects and lowers power of the small cells which are corresponded to the reference index values ranked in top k in which k is a value from 1 to Q-S, to calculate a system throughput which is corresponded to each of the k value and obtain the performance predicting model of each of the k values and the system throughput which are corresponded thereto by a regression analysis method, wherein Q is a total number of the small cells, S is a total number of the small cells which are not in service to any of the user devices.

2. The data driven management device of claim 1, wherein:
   the at least one performance result comprises an energy efficiency parameter and the system throughput; and
   the performance predicting model establishing module and the self-optimizing parameter control module are initiated when the energy efficiency is lower than or equal to a predetermined threshold.

3. The data driven management device of claim 2, wherein:
   the performance predicting model establishing module further detects the small cells which are not in service to any user devices; and
   the data processor shuts down the small cells which are not in service to any of the user devices.

4. The data driven management device of claim 1, wherein the self-optimizing parameter control module obtains an optimized k* value which is corresponded to the best system throughput within the performance predicting model and determines to lower the power of the sorted small cells ranked in top k*.

5. The data driven management device of claim 1, wherein the reference index value of each of the active small cells is a reciprocal of a total signal strength value of the small cells, a total interference value, or a ratio of the interference value and a load sensing value obtained according to a ratio of the total interference value and the total signal strength value.

6. The data driven management device of claim 5, wherein the total signal strength value of the each small cells is a sum of the received signal strength from the each user device within a coverage range of the cell; and the total interference value of the each small cells is the sum of the received interference signal from each served user device by the cell.

7. The data driven management device of claim 1, wherein the regression analysis method is polynomial regression analysis method; and the small cell is a femtocell or a pico cell.

8. A data driven management method of a small cell network for configuring and managing each of small cells within a network system, comprising:
   receiving parameters configured and managed by each of the small cells;
   pre-processing the received parameters to remove unnecessary parameters, and calculating at least one performance result based on the pre-processed parameters;
   detecting each of the small cells which are not in service to any user devices;
   calculating a reference index value of active small cells, and sorting the active small cells based on the reference index value;
   selecting and reducing power of the small cells which are corresponded to the reference indexes ranked in top k in which k is a value from 1 to Q-S, to calculate a system throughput which is corresponded to each of the k value and obtain a performance predicting model of each of the k values and the system throughput which are corresponded thereto by a regression analysis method, wherein Q is a total number of the small cells, S is a total number of the small cells which are not in service to any of the user devices; and
   obtaining an optimized k* value which is corresponded to the best system throughput within the performance predicting model and determining to lower the power of the sorted small cells ranked in top k*.

9. The data driven cell management method of claim 8, wherein the reference index value of each of the active small cells is a reciprocal of a total signal strength value of the small cells, a total interference value or a ratio of the interference value and a load sensing value obtained according to a ratio of the total reference value and the total signal strength value; the total signal strength value of the each small cells is a sum of the received signal strength from each user device within a coverage range of the cell; and the total interference value of the each small cells is a sum of the received interference signal from each served user device by the cell.

* * * * *